(12) United States Patent  (10) Patent No.: US 7,486,895 B2
Werner et al.  (45) Date of Patent: Feb. 3, 2009

(54) EFFECTIVE CONTROL ALGORITHM FOR OPTICAL POLARIZATION MODE DISPERSION COMPENSATORS

(75) Inventors: Dieter Werner, Neunkirchen am Brand (DE); Chongjin Xie, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 420 days.

(21) Appl. No.: 11/301,388

(22) Filed: Dec. 13, 2005

(65) Prior Publication Data

US 2007/0133997 A1  Jun. 14, 2007

(51) Int. Cl.
*H04B 10/12* (2006.01)
(52) U.S. Cl. .................. 398/147; 398/158; 398/159; 398/161; 398/162; 398/152; 398/65; 398/81; 398/29; 398/202; 398/205; 398/208; 398/209; 385/11; 385/24; 385/27; 385/31; 385/122; 385/123; 385/14; 385/124
(58) Field of Classification Search .............. 398/147, 398/148, 149, 158, 159, 81, 79, 213, 162, 398/209, 212, 65, 152, 161, 202, 208, 205, 398/206, 214, 25, 26, 27, 29; 385/24, 37, 385/11, 31, 27, 14, 122, 123, 124
See application file for complete search history.

(56) References Cited

U.S. PATENT DOCUMENTS 7,151,898 B1* 12/2006 Phua et al. ................. 398/158
7,218,856 B2* 5/2007 Takahara et al. ............. 398/81
2006/0245680 A1* 11/2006 Rasmussen et al. .......... 385/11
2007/0110451 A1* 5/2007 Rasmussen et al. ......... 398/158

OTHER PUBLICATIONS

J. C. Rasmussen, et al., "Automatic Compensation of Polarization-Mode Dispersion for 40 Gb/s Transmission Systems," J. of Lightwave Technology, vol. 20, No. 12, Dec. 2002, pp. 2101-2109.
Y. Zheng, et al., "Automatic PMD Compensation Experiment With Particle Swarm Optimization and Adaptive Dithering Algorithms for 10-Gb/s NRZ and RZ Formats," IEEE J. of Quantum Electronics, vol. 40, No. 4, Apr. 2004, pp. 427-435.
D. L. Peterson, Jr. et al., "Field Measurements of State of Polarization and PMD From a Tier-1 Carrier," Proc. OFC'2004, paper F11, 2004.
C. Xie et al., "Two-Stage Optical Polarization Mode Dispersion Compensators for NRZ-DPSK Signals," ITD-05-46284J, 2005.
P. J. Leo et al., "State of Polarization Changes: Classification and Measurement," J. of Lightwave Tech., vol. 21, No. 10, Oct. 2003, pp. 2189-2193.
C. Xie et al., "Dynamic Polarization Mode Dispersion (PMD) and PMD Compensator Model and Their Application to the Study of PMD Compensator Speed Requirement," submitted to OFC'2006.

* cited by examiner

*Primary Examiner*—Hanh Phan

(57) ABSTRACT

The present invention includes apparatus and method of a variable step size dithering control algorithm for polarization mode dispersion controllers (PMDCs). The dithering step size of the PCs is adjusted according to the feedback signal including degree of polarization (DOP).

19 Claims, 2 Drawing Sheets

US 7,486,895 B2

EFFECTIVE CONTROL ALGORITHM FOR OPTICAL POLARIZATION MODE DISPERSION COMPENSATORS

FIELD OF THE INVENTION

The invention is related to the field of optical telecommunications, and in particular, to controlling optical polarization mode dispersion compensators.

BACKGROUND OF THE INVENTION

Polarization mode dispersion (PMD) is one of the main obstacles to the deployment of high-speed long-haul optical communication systems, especially systems with bit rates of 40 Gb/s per-channel and higher. To overcome PMD limitations, optical PMD compensators (PMDCs) are used, which is adaptively adjusted to compensate PMD in the communication systems. An optical PMDC usually consists of several polarization controllers (PCs) and delay lines (birefringence elements). As PMD is not a static phenomenon but fluctuates randomly with time due to temperature changes and mechanical vibrations, a PMDC also comprises feedback signal generator and control electronics to dynamically adjust PCs and delay lines.

SUMMARY

Various deficiencies of the prior art are addressed by the present invention of an optical communication system utilizing PMDC. In accordance with one aspect of the present invention, an optical PMD compensator includes a compensation device having at least one polarization controller (PC) adapted to adjust of at least one wave plate (WP). A polarimeter measures the Stokes vector of an optical signal. A controller calculates a degree of polarization (DOP) wherein a dithering step size of the PC is adjusted according to the DOP.

In accordance with another aspect of the present invention includes a method of mitigating PMD effects in an optical communications network by adjusting a polarization mode dispersion compensator (PMDC) having the steps of calculating a degree of polarization (DOP), adjusting a step size using the calculated DOP, and dithering a wave plate of PMDC using the adjusted step size.

In accordance with another aspect of the invention, an optical communications system including transmitters for transmitting an optical signal with n channels, where n is an integer. An optical link transports the optical signal. A demultiplexer separates the optical signal in n optical channels. At least one polarization mode dispersion compensator (PMDC) suppresses the polarization mode dispersion effects of one channel. A receiver receives the optical signal with reduced PMD effects.

The invention further provides other methods and system elements that implement various aspects, embodiments, and features of the invention, as described in further detail below. The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of optical polarization mode dispersion compensators; however, those skilled in the art and informed by the teachings herein will realize that the invention is also applicable to any apparatus and method that involves improving optical signal quality in a communications network.

Figure 1:
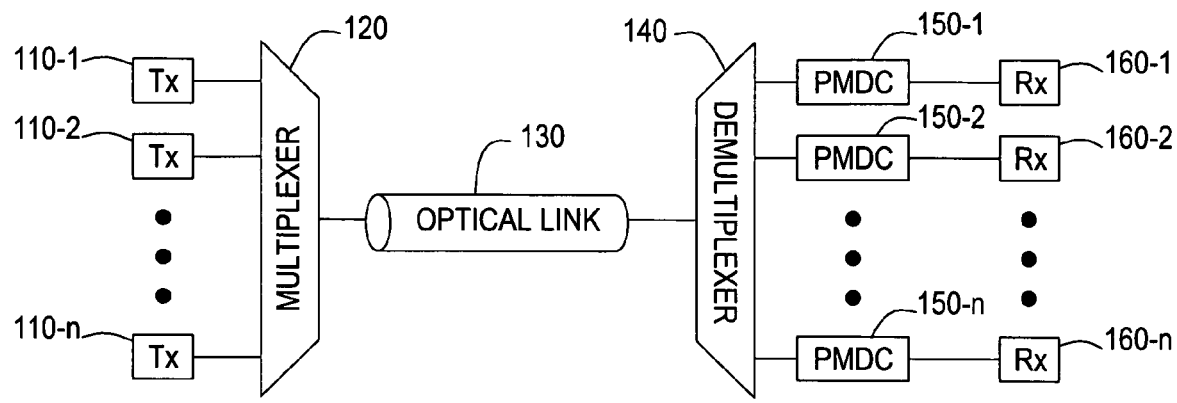
FIG. 1 depicts a block diagram of an optical communications system according to one embodiment of the present invention.

FIG. 1 depicts a block diagram of an optical communications system 100 according to one embodiment of the present invention. The system 100 includes a plurality of optical transmitters 110-1 to 110-n (collectively 110), a multiplexer 120, an optical link 130, an optical demultiplexer 140 to separate the n optical channels, a plurality of Polarization Mode Dispersion Compensators (PMDCs) 150-1 to 150-n (collectively, PMDCs 150), and a plurality of optical receivers 160-1 to 160-n (collectively, receivers 160).

The optical transmitters 110 are coupled to the optical multiplexer 120 and transmit thereto up to n optical signals. Each optical signal includes at least one channel of information. The optical signals can be modulated by the transmitters 110 with any appropriate modulation scheme. In one embodiment, the transmitters 110 generate a 43-Gb/s non-return to zero differential phase shift keying (NRZ-DPSK) signal. In other embodiments, binary phase shift keying (BPSK) or quadrature phase shift keying (QPSK) are used. Other modulation schemes may also be used.

The optical multiplexer 120 receives the optical signals from the n optical transmitters. The optical multiplexer 120 combines the optical signals from the n optical transmitters to form a wavelength division multiplex (WDM) optical signal for high-speed, high bandwidth transmission over the optical link 130.

The optical link 130 communicates the WDM optical signal from multiplexer 120 to demultiplexer 140. The optical link includes many spans, with each span having one or more fiber optical cables and optical amplifiers, and may include dispersion compensation modules (DCM), or reconfigurable optical add-drop multiplexers (ROADMs). In another embodiment, the optical link has one span. The cable may be above ground, underground or under water. The optical transmission media of the optical link 130 may exhibit PMD that drifts over time and wavelength, state of polarization (SOP) variations, amplified spontaneous emission (ASE) noise, etc. which will all contribute to the degradation of the optical signal.

The optical demultiplexer 140 separates the channels of the WDM optical signal into n optical channels so that each receiver can receive a respective optical signal from a corresponding transmitter. In one embodiment, the demultiplexer 140 includes a power splitter and optical filters. In another embodiment, the demultiplexer is an arrayed-waveguide grating (AWG).

Each PMDC 150-1 to 150-n receives a respective optical channel of the WDM optical signal from the demultiplexer 140. The PMDCs 150 reduce the PMD effects of each channel to provide a cleaner optical signal therefrom.

The optical receivers 160 receive the optical signals from the respective PMDCs 150. Each received optical signal contains one channel of improved signal quality. The received optical channels will have better signal quality because the PMD effects of the optical link are suppressed by the PMDC.

In order to suppress the PMD effects, the present invention includes a variable step size dithering control algorithm for the PMDCs. The dithering step size of the PCs is adjusted according to a feedback signal indicative of PMD such as degree of polarization (DOP). As shown by a dynamic PMD and PMDC model, the optimum performance at any PMD variation speed is achieved. The dynamic PMD and PMDC model are described in detail in "Dynamic Polarization Mode Dispersion (PMD) and PMD Compensator Model and Their Application to the Study of PMD Compensator Speed Requirement," by Chongjin Xie et al., submitted to optical fiber communication conference (OFC), 2006, herein incorporated by reference in its entirety.

In another embodiment, the transmission system includes a single channel. In the single channel transmission system, instead of a plurality of transmitters and receivers, one transmitter is coupled to the optical span and one receiver receives the PMDC signal.

Figure 2:
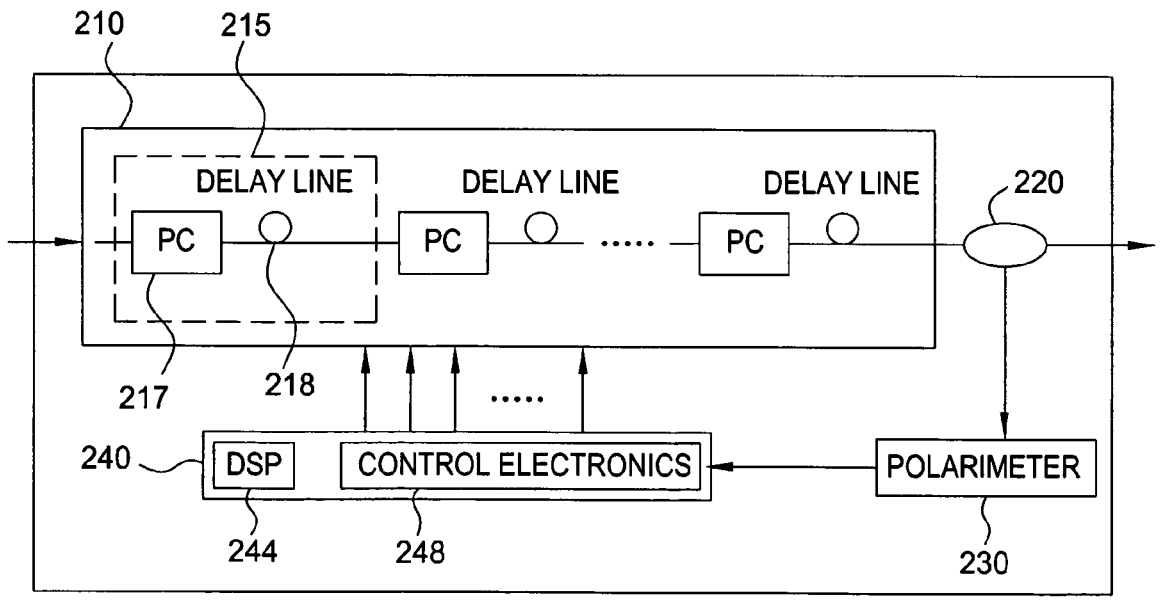
FIG. 2 depicts a block diagram of an optical PMDC according to one embodiment of the present invention.

FIG. 2 depicts a block diagram of an optical PMDC according to one embodiment of the present invention. The optical PMDC 200 of FIG. 2 includes a compensation element 210, a tap 220, a polarimeter 230, and a controller 240.

The input optical signal of FIG. 2 is an optical signal of one channel. The optical signal could be from one of the output ports of the demultiplexer. In one embodiment, the optical signal enters the PMDC at its compensation element 210.

The compensation element 210 includes at least one stage 215, each stage having a fixed or variable delay line 218 connected in series with a polarization controller (PC) 217 in order to modify the polarization state of the optical signal traveling through the compensation element 210. The PC is optionally constructed with many waveplates (WPs). A waveplate is an optical device that alters the polarization state of a light wave traveling through it. In one embodiment, the PCs are composed of four quarter-wave plates (QWPs). QWPs are well known in the art. A QWP will cause light of one linear polarization to be retarded by one quarter wavelength (90°) relative to the orthogonal polarization. The input optical signal enters the compensation elements, and the signal's polarization maybe be adjusted by the at least one stage with at least one WP. The input optical signal which may have been adjusted by the compensation element 210 will pass thorough the tap 220 and exits the PMDC 200 as an output optical signal. In one embodiment, the output optical signal enters the receiver upon leaving the PMDC 150.

The tap 220 will take part of the output optical signal and send the output optical signal to the polarimeter 230. In one embodiment, the tap is an optical coupler. In another embodiment, splitters such as a Y-splitter are used.

The polarimeter 230 measures, illustratively, Stokes vector of the optical signal from the tap 220. The polarimeter transmits the measured Stokes vector to the controller 240. In another embodiment, a delay line is directly measured by a DOP monitor (not shown) where the DOP of the optical signal is then transmitted to the controller 240. In a third embodiment, the power level of the optical signal is measured by a power monitor having a polarizer (not shown) and is transmitted to the controller 240. In a fourth embodiment, monitoring devices is used such that both the power level and the Stokes vector of the optical signal are transmitted to the controller 240.

In one embodiment, the controller 240 includes a digital signal processor (DSP) 244 and a control electronics 248. The controller receives the DOP. In another embodiment, the DSP 244 will use the measured Stokes vector to calculate a degree of polarization (DOP). The DOP is used as the feedback signal to determine the adjustments of the angles to the WPs of the PCs 217. In a further embodiment, power level measured by the power monitor is transmitted as the feedback signal for the controller 240. Other characteristics of the output optical signal may also be used as the feedback signal to control the PMDC, such as Q factor, eye-opening monitoring, RF spectrum, RF power, etc. Moreover, any combinations of feedback signals are possible. The control electronics 248 will send an adjustment signal to the compensation element to adjust the WP of the PC. In another embodiment, the controller 240 includes a field programmable gate array (FPGA). The FPGA (not shown) such as the one available off-the-shelf produced by Xilinx® allows the user to flexibly design the required processing for the controller 240 instead of using a more expensive, specialized DSP chip.

In one embodiment, a dithering method may be used to adjust the WPs of the PCs. To perform the dithering method, a global search is performed to find the optimum position for PCs. In one embodiment, gradient searching methods are used for the global search. PCs are dithered according to measured PMD variations of the link. In one embodiment, an effective variable step size adjustment strategy for the optical PMDC is used, which is described in detail below with respect to FIG. 3.

In one embodiment, the PMDC 200 uses the total optical power as feedback signal. In another embodiment, DOP is the feedback signal. The WPs' angles are dynamically adjusted in response to the feedback signal.

In a tracking phase to be described below, the step size of the WPs angles is adjusted as $d\alpha = A(B-DOP)$ in one embodiment and as $d\alpha = A(B-DOP^2)$ in another embodiment, where $d\alpha$ is in degrees, A is a number value of about a few hundreds, and B is the maximum DOP of the system which is related to optical signal to noise ratio (OSNR) and the optical filter bandwidth at the receiver. B can be determined in the system in the initial searching phase. In the control algorithm, a maximum and minimum step size $d\alpha_{max}$ and $d\alpha_{min}$, are set.

A polarimeter provides the Stokes vector (S0, S1, S2, S3) to the controller. A DOP, $DOP = \sqrt{S_1^2 + S_2^2 + S_3^2}/S_0$, is obtained through the controller 240 including off the shelf components such as a digital DSP 244. While it takes a few steps for DSP 244 to do addition or multiplication, it takes a lot more steps to do division calculations. However, it takes much more time to do square root calculations. To increase the PMDC speed, in one embodiment, $DOP^2$ instead of DOP is used as the feedback signal. In this manner, the square root operation is avoided. In one embodiment, the step size is adjusted proportional to the relationship, $d\alpha = A(B-DOP^2)$. The detailed steps of the controller 240 are shown in the flow chart of FIG. 3.

Figure 3:
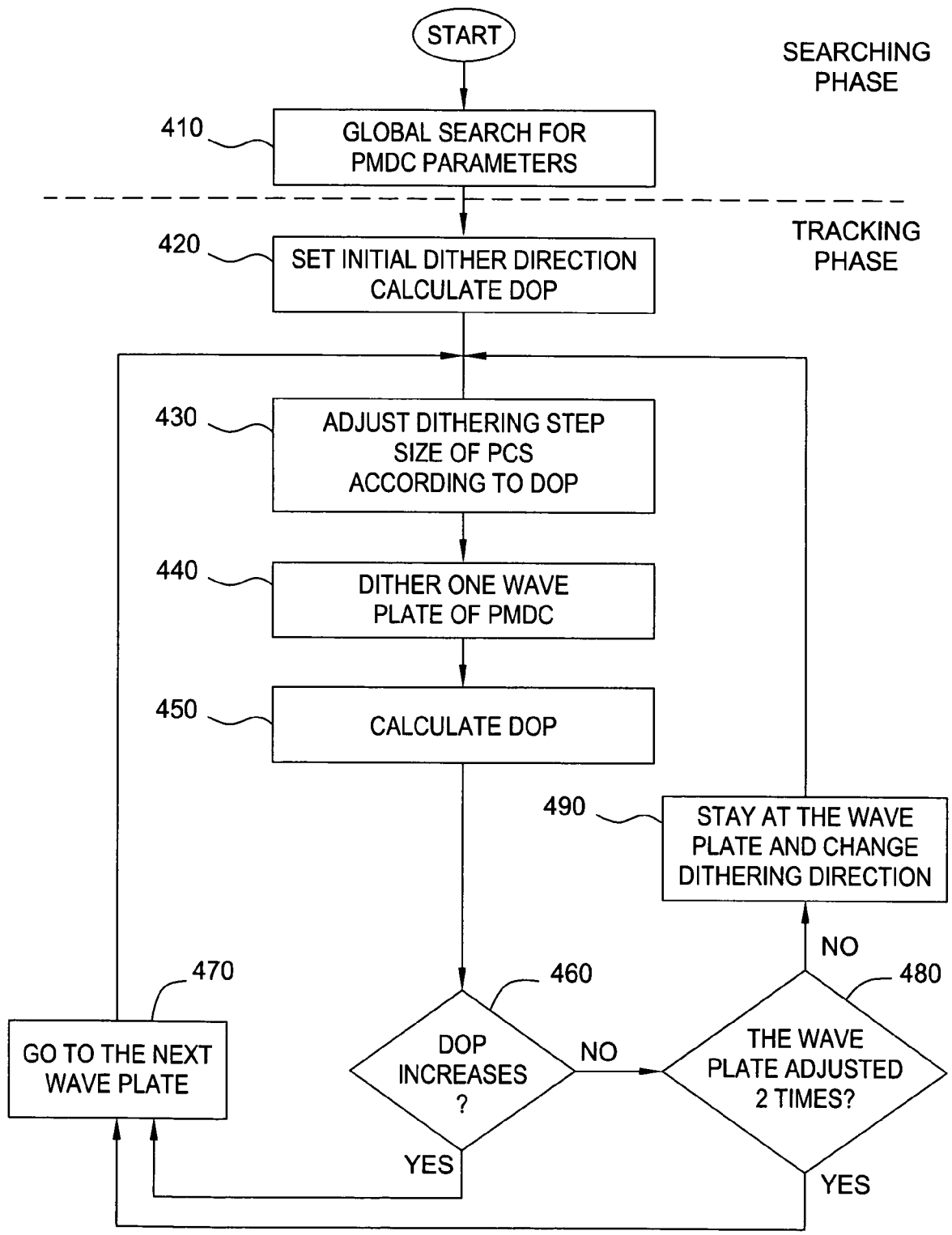
FIG. 3 illustrates a flow diagram of a PMDC adjustment algorithm according to one embodiment of the present invention.

FIG. 3 illustrates a flow diagram of a PMDC adjustment algorithm according to one embodiment of the present invention.

The operation process of a feedback controlled PMDC can be divided into two phases: 1) initial search phase to find the global optimum position for the initial power on or reset conditions; 2) tracking phase to dither the PCs around to continuously track the PMD or the state of polarization (SOP) fluctuations.

In one embodiment, the controller 240 performs a global search for the initial PMDC parameters 410. Once the parameters are initialized, the controller enters the tracking phase.

At step 420, the controller will use the initial parameters obtained in the search to adjust the initial dither direction of the WPs. During the same step 420, DOP or DOP² of the output optical signal is calculated. In one embodiment, DOP value is measured directly from the optical signal. In another embodiment, power level is measured. During the search phase, WPs are adjusted by the step size determined by the controller using the parameters obtained from the search phase. Then, the controller moves to the tracking phase.

At step 430, the controller uses the newly calculated DOP or DOP² and adjusts the dithering step size of the PCs. In one embodiment, the equation $d\alpha = A(B-DOP^2)$ is used. In another embodiment, $d\alpha = A(B-DOP)$ is used. In another embodiment, optical power is used in the equation. Any combinations of feedback signals are usable together as desired. In general, similar equations are found for all possible of feedback signals. In another embodiment, the DOP of a previous clock cycle is used to calculate the optimum step size.

At step 440, the controller dithers the first WP of the PMDC by adjusting the angle of the WP by the determined amount $d\alpha$. In general, the change of the angle of the WP is large when the feedback signal shows that the PMD is high, and the change of the angle of WP is small when the PMD is low.

At step 450, the DOP or DOP² is calculated again with the adjusted output optical signal.

At step 460, the controller determines if the DOP or DOP² has increased or decreased. If DOP or DOP² has increased, then the dithering for the first WP was correct, and the controller continues to step 470. If the DOP or DOP² has decreased, then the dithering for the first WP is deemed incorrect, and the controller continues to step 480 instead.

At step 470, the controller returns to step 430 to dither the next WP.

At step 480, the controller checks if the first WP has been adjusted twice already. If it has, then the controller will go to step 470 where the PMDC will dither the next WP. In another embodiment, if the DOP has not increased after dithering, the WP is returned to the starting position, and the controller will dither the next WP at the same time. If the first WP has not been adjusted twice, then the controller will go to step 490.

At step 490, the controller will change dithering direction of the first WP by adjusting the angle of the WP to $-d\alpha$, and return to step 430.

By implementing the variable step size strategy of FIG. 3 for the PMDC, optimum performance for all the various speeds of the PMD variation as well as for different modulation formats can be achieved. Optimum step size will be adjusted depending on the different feedback signals and for various speeds of SOP. In one embodiment, the optimum A value is about 100 to 300, the minimum step size is about 0.1 to 2 degrees and the maximum step size is about 10 to 20 degrees. Alternate values for these parameters may be used.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A polarization mode dispersion (PMD) compensator, comprising:
   at least one polarization controller (PC), each PC including at least one waveplate (WP) responsively adjustable by a WP adjust signal, wherein each WP is adapted to alter a polarization state of an optical signal;
   a polarimeter for measuring Stokes vector of an optical signal provided by the at least one PC; and
   a controller for calculating a degree of polarization (DOP) from the Stokes vector and responsively adjusting a dithering step of at least one WP;
   wherein the dithering step of each WP is dynamically adjusted according to at least one of a feedback signal representing a power level of the optical signal provided by the at least one PC, $d\alpha = A(B-DOP)$, $d\alpha = A(B-DOP^2)$, or combinations thereof; and
   $d\alpha$ is a step size, 'A' is a scaling factor and 'B' is a maximum DOP.

2. The compensator of claim 1, wherein the polarimeter provides the Stokes vector (S0, S1, S2, S3) of the optical signal to the controller for calculating DOP comprising processing the Stokes vector using: $DOP = \sqrt{S_1^2 + S_2^2 + S_3^2}/S_0$.

3. The compensator of claim 1, wherein the polarimeter provides the Stokes vector (S0, S1, S2, S3) of the optical signal to the controller for calculating DOP comprising processing the Stokes vector using: $DOP^2 = (S_1^2 + S_2^2 + S_3^2)/S_0^2$.

4. The compensator of claim 1, wherein the controller comprises a digital signal processor (DSP) and a control algorithm for adjusting the WPs.

5. The compensator of claim 1, wherein the maximum step and minimum step are about 10~20° and 0.1~2°, respectively.

6. The compensator of claim 1, wherein A is a value in excess of 100.

7. The compensator of claim 6, wherein A is a value between 100-300.

8. The compensator of claim 1, further comprising delay lines disposed in series after each said at least one PC.

9. A method of improving optical signal quality in an optical communications network by adjusting a first waveplate (WP) of a polarization mode dispersion compensator (PMDC) comprising:
   calculating a first degree of polarization (DOP) from a characteristic of an optical signal;
   dynamically adjusting a step size of a first WP using the calculated DOP; and
   dithering the first WP using the adjusted step size to thereby adopt the polarization state of the optical signal.
   wherein the step size is dynamically adjusted according to at least one of a feedback signal representing a power level of the optical signal provided by the at least one PC, $d\alpha = A(B-DOP)$, $d\alpha = A(B-DOP^2)$, or combinations thereof; and
   $d\alpha$ is a step size, 'A' is a scaling factor and 'B' is a maximum DOP.

10. The method of claim 9, further comprising:
    searching for global PMDC parameters; and
    setting an initial dither direction.

11. The method of claim 9, further comprising:
    calculating a second DOP from a characteristic of the adjusted optical signal;
    dithering a second WP if the second DOP if greater than the first DOP;
    determining if the first WP has been adjusted twice if the second DOP is less than the first DOP;
    dithering the second WP, if the first wave plate has been adjusted twice; and
    change the dithering direction of the first WP, if the first WP has been adjusted once.

12. The method of claim 9, wherein a measured Stokes vector of the adjusted optical signal is used as a feedback signal.

13. The method of claim 9, wherein the calculating the DOP comprising processing the Stokes vector using: $DOP^2 = (S_1^2 + S_2^2 + S_3^2)/S_0^2$.

14. The method of claim 9, wherein the calculating the DOP comprising processing the Stokes vector using: $DOP=\sqrt{S_1^2+S_2^2+S_3^2}/S_0$.

15. The method of claim 9, wherein A is a value in excess of 100.

16. The method of claim 15, wherein A is a value between 100-300.

17. An optical communications system comprising:
a transmitter for transmitting an optical signal channel;
an optical multiplexer for combing a plurality of optical channels into one WDM optical signal, wherein the plurality of optical channels includes the optical signal channel;
an optical link for transporting the WDM optical signal;
an optical demultiplexer for separating the WDM optical signal into the plurality of optical channels, wherein one of the plurality of channels includes the optical signal channel;
a polarization mode dispersion compensator (PMDC) having at least one waveplate (WP) for suppressing the polarization mode dispersion effects of the optical signal channels, wherein suppressing the polarization mode dispersion effects comprises the steps of:
determining a degree of polarization (DOP);
dynamically adjusting a step size using the calculated DOP; and
dithering a wave plate of PMDC using the adjusted step size to thereby adopt the polarization state of the optical signal; and
a receiver for receiving the optical signal channel from the transmitter.
wherein the step size is dynamically adjusted according to at least one of a feedback signal representing a power level of the optical signal provided by the at least one PC, $d\alpha A$ (B−DOP), $d\alpha = A$ (B−$DOP^2$), or combinations thereof: and
$d\alpha$ is a step size, 'A' is a scaling factor and 'B' is a maximum DOP.

18. The optical communications system of claim 17, wherein A is a value in excess of 100.

19. The optical communications system of claim 18, wherein A is a value between 100-300.

* * * * *